March 22, 1932.    W. C. RAUBE    1,850,772
SYSTEM OF MOTOR CONTROL
Filed Feb. 16, 1929
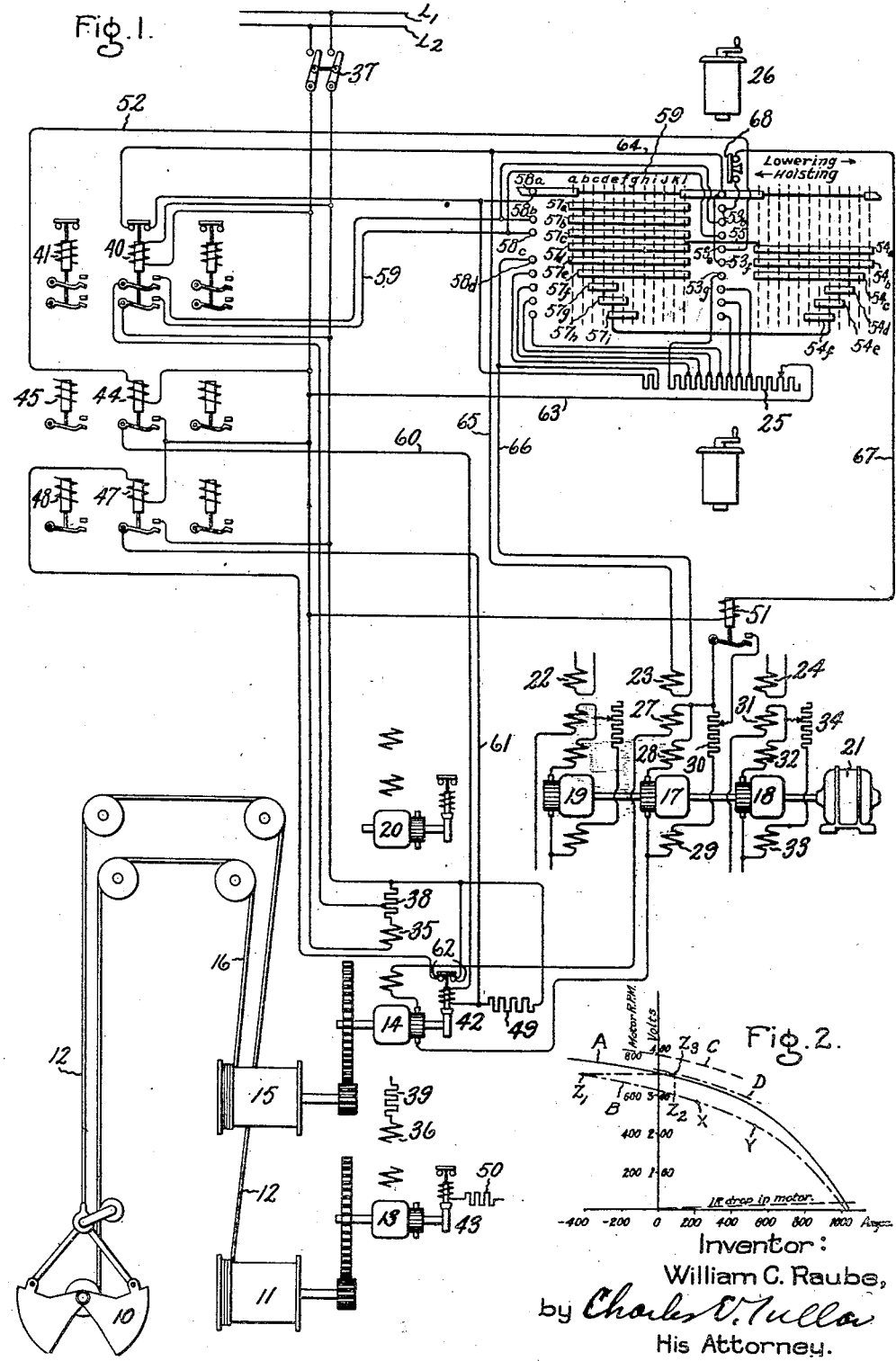
Inventor:
William C. Raube,
by Charles V. Tullar
His Attorney.

Patented Mar. 22, 1932

1,850,772

UNITED STATES PATENT OFFICE

WILLIAM C. RAUBE, OF SCHENECTADY, NEW YORK, ASSIGNOR TO GENERAL ELECTRIC COMPANY, A CORPORATION OF NEW YORK

SYSTEM OF MOTOR CONTROL

Application filed February 16, 1929. Serial No. 340,594.

This invention relates to control systems for electric motors; more particularly to systems in which a plurality of motors are employed for hoisting and lowering load bodies, and has for its object the provision of a simple and efficient system of motor control whereby the hoisting load is divided evenly between the motors and whereby one of the motors runs light when the other is being overhauled by a descending load.

In ore bridge cranes of the type employed to lift a load and transport it on an overhead track from one place to another, a grab-bucket having gravity opened jaws is arranged to be hoisted by an electric motor connected to a drum upon which the holding line is wound. A closing line for closing the jaws of the bucket is wound upon a separate drum and driven by a separate motor. In the operation of these cranes, it is desirable from an economic point of view to operate both the closing line motor and the holding line motor either when hoisting or lowering a loaded bucket to divide the load evenly between these motors, and to this end these motors or driving units are designed to be as nearly alike as possible, and to have similar valued drooping characteristic curves to facilitate the even distribution of the load.

A regular operating condition is the lowering of an empty bucket with the jaws open. In this operation, the descending load will naturally tend to overhaul both motors and drive them above full running light speed. Obviously, if the closing line motor is permitted to be overhauled, the closing line will be under tension and the jaws will be closed. In order that the jaws shall not be closed, it is necessary that the holding line should sustain the entire weight of the overhauling load, and that the driving speed of the closing line motor should be increased to a value equal to that at which the holding line motor is being overhauled.

In illustrating my invention in one form thereof I have shown it as embodied in a system of motor control for electrically operated ore bridge cranes and the like in which the driving units for the bucket, i. e., the driving unit for the closing line and the driving unit for the holding line are designed to have approximately similar drooping characteristics to facilitate the equal division of the load between the motors when a loaded bucket is being hoisted, and in accordance with the invention means are provided for increasing the speed of the driving unit for the closing line motor to a value substantially equal to that of the motor for the holding line when the latter is overhauled by an empty descending bucket.

For a better and more complete understanding of the invention reference should be had to the following specification and to the accompanying drawings in which Fig. 1 is a diagrammatical representation of an embodiment of the invention, and Fig. 2 is a chart showing typical speed-torque characteristic curves of the driving units employed in the system.

Referring now to the drawings, a grab-bucket 10 of an ore bridge crane or similar hoisting device is connected to a winding drum 11 by means of a holding line 12 and is arranged to be raised or lowered by means of a suitable electric motor 13, with the shaft of which the winding drum 11 is connected through suitable gearing. A motor 14 designed to have operating characteristics similar to those of motor 13 is connected by gearing to rotate a winding drum 15 upon which is wound the closing line 16 which serves when placed under tension to close the normally gravity opened jaws of the bucket 10. The closing line motor 14 is connected to be supplied with electric power from a generator 17 and the holding line motor 13 is similarly connected and supplied from a generator 18 (the connections being omitted from the drawing for the purpose of simplifying it). A third generator 19 is connected to supply a trolley motor 20 which, after the bucket has been hoisted, for example from the hold of a ship, serves to transport the bucket along an elevated trackway on the ore bridge crane to a pile a short distance away. Here again the connections have been omitted for the purpose of simplifying and facilitating the reading of that which would otherwise become an unduly complicated drawing.

The generators 17, 18, 19 are mounted upon a common shaft as shown, and arranged to be driven by any suitable driving means such as the electric motor 21.

The generators 19, 17, and 18 are provided with field windings 22, 23, and 24 respectively which are supplied with direct current from a separate source of excitation designated by the two supply lines $L_1$ and $L_2$. The magnitude of the voltage generated by the generator 17 and consequently that of the speed of the closing line motor supplied thereby is controlled by a resistor 25 connected in the circuit of the separably excited field winding 23 which is arranged to be varied by suitable master switch mechanism such as the drum controller 26. It will be understood that similar resistors are connected in the circuits of the field windings 22 and 24 of generators 19 and 18 respectively, and that they are controlled by drum controllers similar to controller 26.

In addition to the separately excited field winding 23, generator 17 is provided with a series differential field winding 27, a commutating field winding 28 and a self-excited shunt winding 29, the latter being connected across the armature in series with a resistor 30. The separately excited field winding 23 and the shunt field winding 29 are wound to act accumulatively with each other whilst the series field winding 27 is wound to act differentially with the two shunt fields when the generator is operating under load. This results in a drooping characteristic for the generator, that is to say the curve showing the voltage generated by the generator droops with increasing load as shown by the curve A in the chart of Fig. 2.

Generator 18 which supplies the holding line motor 13 is similarly provided with correspondingly wound field windings 31, 32 and 33 and a resistance 34 connected in series with the self-excited shunt field winding 33, and the generator will have a drooping characteristic curve similar to that of generator 17 as shown by curve A in the chart of Fig. 2.

Closing line motor 14 and holding line motor 13 are provided with field windings 35 and 36 respectively, which are supplied from the separate source of excitation $L_1$, $L_2$ when the line switch 37 is in the closed position. Economy resistors 38 and 39 connected in series relationship with field windings 35 and 36 respectively, are arranged to be short-circuited by relays 40 and 41 when the respective master controllers for the motors are actuated to an operative position. The motors 14 and 13 are held against rotation by suitable braking devices shown as electromagnetic solenoid brakes 42 and 43, the solenoid circuits of which are controlled by relays 44 and 45 respectively to release the brake when the motor controllers are in an operative position. Relays 47 and 48 serve to insert economy resistors 49 and 50 in the solenoid circuits when the brakes are released.

As will be understood by persons skilled in this art, the motors 13 and 14 being supplied from generators 17 and 18 having drooping volt-ampere characteristics as shown by curve A in Fig. 2, and the motors themselves being designed similar to each other in all respects will each have drooping speed-torque curves as shown by curve B in Fig. 2. It will also be understood that motors having drooping speed-torque curves, such as the curve B operate very satisfactorily on a common load and tend to divide a common load evenly.

It has already been pointed out in this specification that a regular operating condition of an ore bridge crane is the lowering of an empty bucket with open jaws, and that this operation requires that there be no tension on the closing line, for otherwise the jaws would be closed. The holding line motor which will therefore be required to support the entire weight of the bucket will be overhauled and driven above its running light speed at some speed such as that indicated by the point $Z_1$ on curve B. On the other hand, the closing line motor which will be required to drive the winding drum to pay out the closing line would tend to operate at a speed slightly less than its running light speed as indicated by the point $Z_2$ on curve B. Obviously this condition can not exist without the load likewise tending to overhaul closing line motor 14 thereby placing tension on the closing line. Therefore it becomes necessary to drive the closing line motor at a speed equal to that at which the holding line motor is being overhauled. To this end a relay 51 is connected with the drum controller 26 for the closing line generator 17 and arranged to have its contacts closed when the controller is operated to the lowering position, to short circuit a portion of the resistor 30 in the separately excited field circuit of the generator. The effect of short circuiting a portion of the resistance in the circuit of the field winding of the generator is to increase the value of the generated voltage and likewise to increase the speed of the closing line motor supplied thereby. In other words the generator will be given a new higher valued voltage curve and the motor a new higher valued speed curve such for example as the curves C and D respectively in the chart of Fig. 2. The motor 14 will now operate at a speed indicated by the point $Z_3$ on the curve of D which corresponds in value with the point $Z_1$ of curve B at which speed the holding line motor is operating.

From the above understanding of the relationships of the elements and their functions, the operation which will now be described will be readily understood.

With the line switch 37 and the relays 40 and 47 operated to the closed position, the closing line controller 26 and the holding line controller are operated simultaneously to the left for hoisting operation as indicated by the arrow. The closing line controller being the only one shown in detail in the drawings, its operation will be explained, it being understood that the operation of the holding line controller is exactly the same except as may otherwise be indicated.

In the first hoisting position of the controller, a circuit is established for the winding of relay 44 that may be traced from $L_2$ through the coil of relay 44, conductor 52, contact 53e, segment 54a, bridge 55, segments 57d and 57c, contact 58c, conductor 59, lower contact of relay 40 to $L_1$. Relay 44 closes in response to energization of its coil and completes a circuit for the winding of solenoid brake 42 from $L_2$ through contacts of relay 44, conductor 60, winding of brake 42, conductor 61, normally closed contacts of relay 47 to $L_1$. The brake is now released, and in its released position, its auxiliary contacts 62 are operated to the open position to interrupt the energizing circuit of relay 47, thereby permitting its contacts to open and insert economy resistor 49 in circuit with the brake solenoid. Resistor 49 permits just sufficient current to flow through the winding to maintain the brake released, but not sufficient to operate it initially.

Simultaneously with the release of the brake, a circuit is established for the separately excited field winding 23 of generator 17, and a low voltage is applied to the terminals of motor 14. The circuit for the field winding 23 is as follows: $L_2$, conductor 63, resistor 25, contact 53g, segments 54c and 54b, contact 53f, conductors 64, 65, field winding 23, conductor 66, contact 58d, segments 57e, 57d, 57c, conductor 59, lower contact of relay 40 to $L_1$. Actuation of the controller 26 successively through the positions a—l causes the staggered segments 57f, 57g, 57h, 57i, 54f, 54e, 54d to short circuit successive portions of the resistor 25 in the order named. In the final position l of the controller the generators 17 and 18 will be developing full voltage and the motors 14 and 13 will be operating at a speed dependent upon the load, such for example as a speed indicated by a point on curve B, between the points X—Y and will be dividing the load evenly between them. Stopping of the motor may be accomplished by returning the controller to the central or off position. The short circuited sections of field resistor 25 will be reinserted in the field circuit in the reverse order as the controller is returned; and in the off position, the field circuit for the generator will be interrupted and the relay 44 deenergized to interrupt the circuit of solenoid brake 42 and permit it being set by its spring.

To lower the bucket with jaws open, it is only necessary to operate the controller to the right as indicated by the arrow. Because of the fact that the controllers shown are cylindrical in form with the two rows of stationary contacts located 180° apart, actuation of the controller to the right for lowering, causes the same control circuits to be established as were established by actuating the controller to the left except that the circuit through the field winding 23 of the generator 17 is established in the reverse direction. For this reason it is deemed unnecessary to retrace the circuits.

When the controller 26 is operated to the lowering position a circuit is established for relay 51 that extends from $L_2$ through the coil of relay 51, conductor 67, normally closed contacts of switch 68, contact 53b, segments 57a, 57b and 57c, contact 58c, conductors 59, lower contact of relay 40 to $L_1$. Relay 51 closes in response to energization of its coil and short circuits a portion of the resistor 30 thus causing generator 17 to operate on the curve C and motor 14 to operate on the curve D, as previously explained. Holding line motor 13 will be overhauled at some such speed as that indicated by point $Z_1$ on curve B. The closing line motor 14 however will operate at an equal speed as indicated by the point $Z_3$ on curve D. Thus motor 14 will pay out line, at the same speed that motor 13 is overhauled by the bucket, and there will be no tendency for the load to overhaul the closing line motor, and therefore no tendency to place tension on the line to close the jaws.

Should it be desired to lower a loaded bucket and to cause both motors to share the overhauling load, the clasp switch 68 located on the controller may be depressed to open the energizing circuit of relay 51, thus rendering it impossible for the relay to close and short circuit the resistor 30. In this case, both motors operate on the curve B and share the overhauling load evenly.

From the above description and explanation it will be clear that to lower an empty bucket with the jaws open it is only necessary to operate the controllers for the holding line and closing line motors simultaneously to the lowering position, the rest of the operation being automatic and requiring no attention or skill on the part of the operator. And it will also be seen that manipulation of the controllers for lowering a loaded bucket is the same as for lowering an empty bucket with jaws open with the exception that clasp switch 68 must be depressed.

In accordance with the provisions of the patent statutes, I have described my invention as embodied in concrete form and as operating in a specific manner. But I would have it understood that I do not limit myself to the exact form or connections illustrated since various forms or changes will suggest themselves to skilled workers in the art without departing from the true spirit and scope of my invention.

What I claim as new and desire to secure by Letters Patent of the United States, is:

1. In a system of motor control for raising and lowering a load body, a plurality of drive motors connected to said load body, control means for controlling the direction of rotation of said motors, and means operable in response to an operation of said control means for causing one of said motors to be overhauled by the load at a speed above normal full speed and for increasing the driving speed of another of said motors to a value substantially equal to the speed of said overhauled motor so as to render said other motor ineffective to share an overhauling load.

2. In a system of motor control for raising and lowering a load body, a plurality of direct current motors, means including connections to a source of power for supplying electromotive forces to said motors, control means for controlling said motors so as to cause said motors to share the load when raising said body and means controlled by said control means for adjusting the electromotive forces supplied to said motors to cause one of said motors to operate as a motor at a speed substantially equal to the speed of another of said motors when said other motor is being overhauled by the load at a speed above normal full speed.

3. In a system of motor control for hoists and the like, a plurality of driving motors connected to a common load, master controllers having hoisting positions and lowering positions for controlling the operation of said motors, means comprising connections established in the lowering position of said controllers to provide for overhauling one of said motors by the loads at a speed above normal full speed, and means operable in the lowering position of said controllers for increasing the electromotive force supplied to another of said motors to increase the driving speed thereof to a value substantially equal to the speed of said overhauled motor and thereby render said other motor ineffective to share an overhauling load.

4. In a system of motor control for an electrically operated bucket, a holding line motor, a closing line motor having a speed-torque characteristic similar to that of said holding line motor, and means for increasing the driving speed of the closing line motor to a value substantially equal to the speed of said holding line motor when the latter is overhauled by the bucket at a speed above normal full speed.

5. In a system of motor control for electrically operated ore bridges and the like, a holding line motor for hoisting the bucket, a closing line motor for closing the jaws of the bucket, a master controller for said closing line motor having a lowering position and connections controlled by said controller through which the driving speed of said closing line motor is increased to a value substantially equal to that of the holding line motor when the latter is overhauled by the bucket at a speed above full speed.

6. In a system of plural motor control wherein two motors having equi-valued speed-torque characteristics when driving a common load are required to run at the same speed when one of said motors is overhauled by the load, while the other of said motors is required to run light, a plurality of generators one for supplying each motor, a controller having an operative position, and connections controlled thereby when operated to said position, through which the voltage of the generator supplying said motor which runs light is increased to a value sufficient to increase the speed of said motor to a value equal to that of said other motor when said other motor is overhauled by said load.

7. A system of motor control for electrically operated buckets comprising a holding line motor and a closing line motor wherein both of said motors have similar speed-torque characteristics and wherein said closing line motor is required to run at a speed when paying out line equal to that of said holding line motor when overhauled by its load, a master controller having a lowering position, a generator having a field circuit under the control of said master controller for supplying said closing line motor, and connections controlled by said controller when in said position through which the voltage of said generator is increased to increase the values of a portion of the speed-torque curve of said closing line motor when paying out line to equal the speed values of the speed of said holding line motor when said holding line motor is overhauled by the descending bucket.

8. A system of motor control for an electrically operated grab-bucket comprising a holding line motor and a closing line motor, said motors having similar valued drooping speed-torque characteristic curves, respective supply generators therefor, respective controllers for each of said generators for controlling the field circuit thereof, each of said controllers having a hoisting position and a lowering position, connections controlled by said controllers when operated to the hoisting position through which both of said motors are rendered effective to hoist the bucket, and connections controlled by said closing line motor controller when operated to the lowering position to increase the voltage supplied to the closing line motor to cause it to pay out line at a speed equal to that of said holding line motor when said holding line motor is driven above normal full speed by said bucket.

9. In a system of plural motor control for ore bridges and the like, a holding line motor, a closing line motor, both of said motors having similar valued drooping speed torque characteristics, a generator for supplying said closing line motor, means for controlling the voltage supplied to said closing line motor including a master controller having a lowering position and a resistor in the field circuit of said generator controlled thereby for controlling the speed of said motor, a second field circuit for said generator including a resistor, and a relay controlled by said controller when operated to the lowering position for short-circuiting a portion of said last-mentioned resistor for increasing the voltage supplied to said closing line motor to a value sufficient to cause said closing line motor to operate at a speed substantially equal to that of said holding line motor when overhauled at a speed above normal full speed.

10. In a system of plural motor control for ore bridges and the like, a holding line motor, a closing line motor, both of said motors having similar valued drooping speed-torque characteristics, a generator for supplying said closing line motor, means for controlling the voltage supplied to said closing line motor including a master controller having a lowering position and a resistor in the field circuit of said generator controlled thereby, a second field circuit for said generator including a resistor, and a relay controlled by said controller when operated to the lowering position for short-circuiting a portion of said last-mentioned resistor for increasing the voltage supplied to said closing line motor to a value sufficient to cause said motor to pay out holding line at a speed substantially equal to that of said holding line motor when overhauled at a speed above normal full speed, and a manually operated switch for rendering said relay ineffective to short-circuit said portion of said resistor so as to cause both motors to be overhauled.

In witness whereof, I have hereunto set my hand this 15th day of February, 1929.

WILLIAM C. RAUBE.